United States Patent [19]

Kraicar

[11] Patent Number: 4,629,905
[45] Date of Patent: Dec. 16, 1986

[54] CIRCUIT ARRANGEMENT COMPRISING TWO FEED CIRCUITS CONNECTABLE TO A LOAD HAVING MUTUALLY OPPOSITE POLING

[75] Inventor: Heinz Kraicar, Poecking, Fed. Rep. of Germany

[73] Assignee: Siemens Aktiengesellschaft, Berlin and Munich, Fed. Rep. of Germany

[21] Appl. No.: 750,143

[22] Filed: Jul. 1, 1985

[51] Int. Cl.⁴ .................................................. H02J 7/00
[52] U.S. Cl. ...................................... 307/72; 307/130; 307/64; 361/91; 361/62; 379/348
[58] Field of Search .......... 307/72, 103, 130, 241–243, 307/64, 66; 361/1, 42, 43, 46, 47, 48, 50, 56, 63, 64, 65, 66, 67, 68, 69, 90–93; 324/51, 52, 64, 58 R, 58 A, 58.5 A; 179/170 J

[56] References Cited

U.S. PATENT DOCUMENTS

| | | | |
|---|---|---|---|
| 3,760,228 | 9/1973 | Uchida | 361/91 |
| 4,285,057 | 8/1981 | Sbuelz | 307/243 X |
| 4,357,545 | 11/1982 | Le Grand et al. | 307/64 |
| 4,362,952 | 12/1982 | Ziegler | 307/64 X |
| 4,408,248 | 10/1983 | Bulley et al. | 361/91 |
| 4,459,491 | 7/1984 | Ziegler | 307/64 |
| 4,462,058 | 7/1984 | Ziegler | 307/64 X |

Primary Examiner—William M. Shoop, Jr.
Assistant Examiner—Shik Luen Paul Ip
Attorney, Agent, or Firm—Hill, Van Santen, Steadman & Simpson

[57] ABSTRACT

A circuit arrangement comprises two feed circuits which are connectible to a load with mutually opposite polarity. The circuit arrangement avoids mechanical contacts in the load circuit, at least with respect to one feed circuit. This is achieved in that switches, provided for the activation at at least one of the feed circuits, are disposed outside of the output circuit and in that a transistor is disposed between such a feed circuit and the load, this transistor being conductive given an activated feed circuit and being inhibited given a deactivated feed circuit. The circuit arrangement can advantageously be employed in remote feed devices of communications transmission device for the purpose of optionally feeding a remote feed section with a remote feed current or with a fault locating voltage.

15 Claims, 9 Drawing Figures

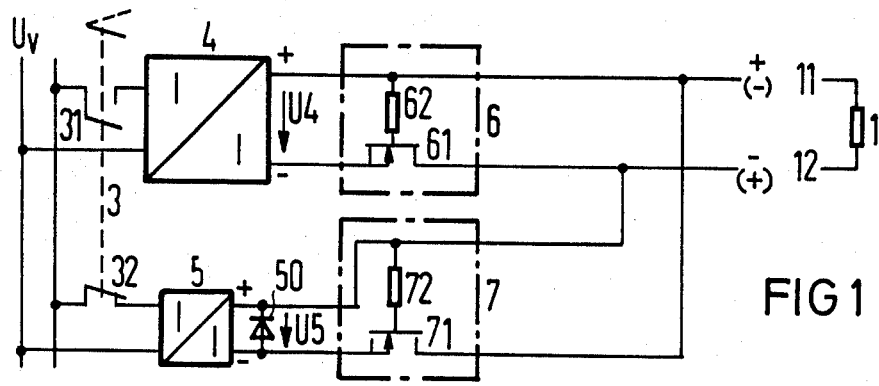
FIG 1
FIG 2
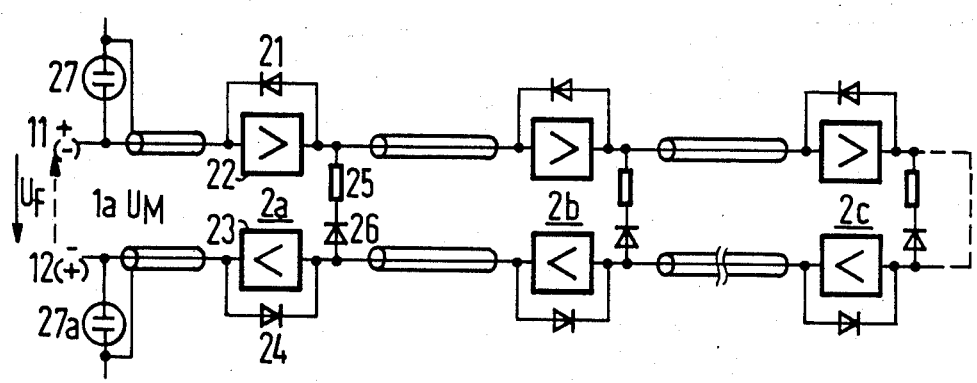
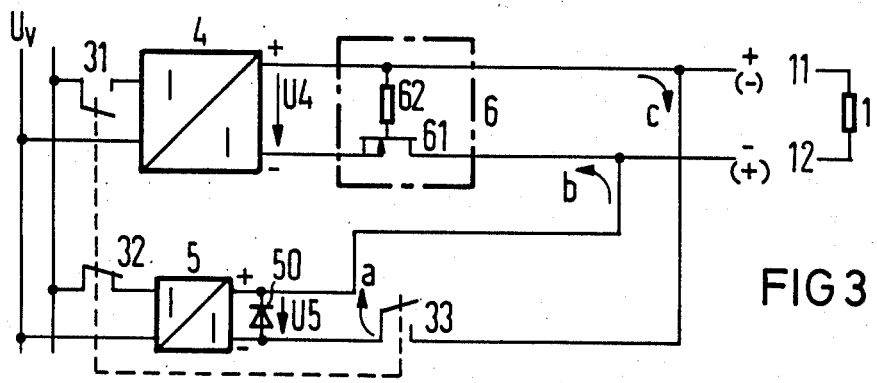
FIG 3

CIRCUIT ARRANGEMENT COMPRISING TWO FEED CIRCUITS CONNECTABLE TO A LOAD HAVING MUTUALLY OPPOSITE POLING

BACKGROUND OF THE INVENTION

1. Field of the Invention

The present invention relates to a circuit arrangement comprising two feed circuits connectible to a load having mutually opposite poling and comprising a pair of leads for a load resistor respectively connected to the feed circuits via feed current paths and comprising means for optionally feeding of the load resistor by way of one or the other feed circuit.

2. Description of the Prior Art

A circuit arrangement of the type generally set forth above is already known from the German published application 32 16 497, fully incorporated herein by this reference. Given this known circuit arrangement, the feed circuit is composed of a constant current source. The further feed circuit is obtained by connecting a voltage limiter to the constant current source. In view of personal protection in the locating position, a reduction of the device voltage to, for example a maximum of 60V is provided.

The two feed circuits are conducted by way of a common pair of feed current paths to a transfer device which optionally connects the load resistor to one or the other polarity and the two feed current paths. A relay which enables a automatic error locating and is correspondingly driven serves as a transfer device.

The load resistor is a remote feed loop which feeds a plurality of series-connected loads with constant direct current. The remote feed loop is provided with shunt arms which respectively contain a diode poled in the reverse direction for the remote feed loop and the resistor disposed in series therewith. When the test voltage poled opposite the remote feed voltage is applied to the input of the remote feed loop and when the remote feed loop is interrupted at any location whatsoever, a current then flows in all shunt arms which lie upstream of the interruption. The sum current is measured at the feed location. An interrupted repeater section is assigned to every measured value.

The remote feed device is switched from constant current to constant voltage. This becomes all the more difficult the higher the remote feed power in relationship to the locating power. Further, inverting the poles becomes relatively complicated given serious operation of remote feed devices.

Another possibility for optionally feeding an electrical load with voltages of different polarity resides in the utilization of mechanical contacts having manual activation.

W. S. Jahn, "Elektrisch fernüberwachen und Fernbedienen", 1962, Richard Pflaum Verlag, Munich, Page 218, also discloses that electrical lines in electrical remote control can be multiply exploited in that remote control signals having different polarity are employed.

SUMMARY OF THE INVENTION

The object of the present invention is to provide a circuit arrangement of the type generally set forth above such that particularly high reliability derives. In particular, the circuit arrangement should be suitable for use in remote feed devices of electrical communications transmission technology which contain a test voltage source of opposite polarity in addition to a remote feed current source.

According to the invention, the above object is achieved in that the circuit arrangement is designed such that switch devices provided for activation at at least one of the feed circuits are disposed outside of the output circuit, and in that a transistor is located between the feed circuit and the pair of leads for a load resistor in one of the feed current paths at at least one feed circuit and is activatible by way of a switch device disposed externally of the output circuit, and in that the control electrode of the transistor is connected to such a control potential that the transistor is rendered conductive given an activated assigned feed circuit and is inhibited given a deactivated assigned feed circuit.

As a result of the above measures, a circuit arrangement is provided wherein at least one of the feed circuits does not require a mechanical contact in its output circuit for optional connection to the load resistor. On the contrary, the output of the feed circuit is connected to the load resistor via an automatically engageable and disengageable semiconductor switch. The semiconductor switch has the property that it is conductive given an activated feed circuit and is inhibited given a deactivated circuit. Since the two feed circuits are alternately activated or deactivated, semiconductor switch prevents the output of a deactivated feed circuit from loading the output of an activated feed circuit. This is particularly significant given feed circuits wherein a diode is effective at the output, the diode being inhibited for the output voltage of the feed circuit, but being poled in the conductive direction for the output voltage of the other feed circuit and would therefore practically represent a short circuit of the output voltage for the other feed circuit. Such a diode, effective at the output, can, in particular, be a component of a rectifier circuit of an inverter or rectifier or can be a diode additionally applied for the protection of the feed circuit.

On the basis of the measures of the invention set forth above, a circuit arrangement is provided which enables the desired feed of a load resistor with currents of opposite polarity with particularly high reliability and by way of applying measures which are particularly easy to realize.

Given the utilization of a circuit arrangement in the remote feed devices having an error locating and/or check device, a separate auxiliary voltage is advantageously employed as a check voltage source or, respectively, locating voltage source, and this auxiliary voltage can be advantageously by a small inverter which is relatively simple. The auxiliary voltage is constant and dimensioned from the very outset to meet personal safety requirements.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic circuit diagram of a circuit arrangement comprising two feed circuits for feeding the load resistor and having voltages of opposite polarity;

FIG. 2 is a schematic circuit diagram of a remote feed loop having remotely fed regenerators and diode shunt arms;

FIG. 3 is a schematic circuit representation of a circuit arrangement comprising two feed circuits of which one feed circuit is connected to a common load resistor by way of an electronic switch and the other feed circuit is connected to a common load resistor by way of a mechanical switch;

DESCRIPTION OF THE PREFERRED EMBODIMENTS

Figure 4:
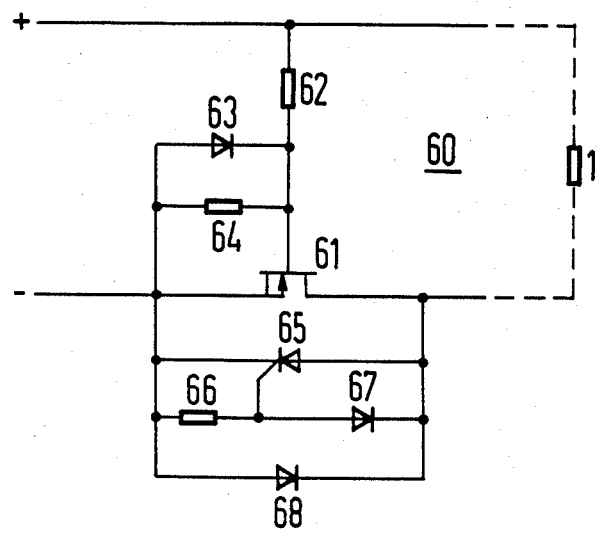
FIG. 4 is a schematic circuit diagram of an electronic switch comprising a field effect transistor.

Referring to FIG. 1, a circuit arrangement is illustrated which comprises two feed circuits 4 and 5. The feed circuit 4 serves as a remote feed current source and is connected to a supply voltage $U_v$ by way of a switch 31. The feed circuit 5 serves as a test voltage source and is connected to the supply voltage $U_v$ by way of a switch 32. The switches 31 and 32 are actuated in common such that when one switch is open the other is closed.

The feed circuit 4 outputs a positive voltage U4 at its output. A diode 50 is poles in the reverse direction at the output of the feed circuit 5.

The outputs of the feed circuits 4 and 5 are connected to a common load resistor 1 by way of respective semiconductor switches 6 and 7.

From the output of the feed circuit 4, the positive pole is directly connected to the terminal 11 of the load resistor 1 and the negative pole is connected by way of the source-drain path of a power field effect transistor 61 to the terminal 12 of the load resistor. The control electrode of the field effect transistor 61 is connected by way of a resistor 62 to the positive pole of the output of the feed circuit 4.

The semiconductor switch 7 is constructed in the same manner as the semiconductor switch 6. The source-drain path is again connected into the current path which leads from the negative pole to the feed circuit 5 to the terminal 11 of the load resistor 1.

In the circuit arrangement of FIG. 1, the field effect transistor 61 and 71 are of the n-type and are respectively connected into the negative line of the appertaining feed circuit. When a field effect transistor of the p-type is employed, then the source-drain path is connected to the positive line such that the source electrode is connected to the positive pole of the output of the feed circuit 4 or, respectively, 5. The gate dropping resistor is thereby connected to the negative line of the appertaining feed circuit.

FIG. 2 shows a circuit arrangement for locating an interruption location of a remote feed loop for series-fed regenerators. In order to be able to locate an interruption of the remote feed loop, the remote feed loop is provided with shunt arms which respectively contain a diode 26 and a resistor 25 connected in series therewith. The diodes 26 are inhibited in remote feed operation. The fault locating occurs by feeding the remote feed loop with a voltage having the reverse polarity.

Given the remote feed loop shown in FIG. 2, the poling without parenthesis is effective in normal operation. Given interruption of the remote feed path, the reverse polarization, indicated in parenthesis is switched on. In this circuit condition, the section resistance which is composed of the resistor 25 connected parallel up to the interruption location can be identified with a current-voltage measurement and, therefore, the interrupted repeater section can be identified.

The circuit arrangement shown in FIG. 1 enables the remote feed voltage $U_F$ or the locating voltage $U_M$ to be optionally connected to the remote feed loop by way of a semiconductor switch 6 which, without external control, automatically becomes conductive given remote feed operation and inhibits during fault locating operations.

The semiconductor switches provided in accordance with FIG. 1 at the remote feed side of the feed circuits 4 and 5 are, as illustrated, preferably metal-oxide-semiconductor-field effect transistors (MOS-FET's). Under given conditions, bipolar transistors can be utilized.

When, for example, the contact 31 is opened and the contact 32 is closed, then only the feed circuit 5 formed by an auxiliary inverter is placed in operation. It generates, for example, 40V and controls the field effect transistor 71 so that it becomes conductive. The field effect transistor 61 is not driven since the voltage at the feed circuit 4, designed as a primary inverter, is "0". The locating voltage 40V with the polarization (+), (−) is applied to the remote feed output 11, 12. The locating voltage cannot feed any current into the feed circuit 4 since the field effect transistor 61 is inhibited.

When the contact 31 is closed and the contact 32 is open, the remote feed voltage has the polarization (+), (−) applied to the remote feed output 11, 12. The field effect transistor switch 6 is then rendered conductive and the field effect transistor 7 is inhibited.

By alternate connection and disconnection of the feed circuit 4, 5 to the remote feed output 11, 12, either the remote feed voltage with constant current or the polarity-inverted constant locating voltage can therefore be obtained.

During operation of the feed circuit 4, the field effect transistor 7 must inhibit the entire remote feed and also be able to withstand potential influencing and lightening voltages. In uses in which one must count on particularly high overvoltages, a relay is advantageously employed in accordance with FIG. 3 instead of the field effect transistor switch 7. A significant advantage of this arrangement is thereby retained, namely that the primary circuit is not conducted by way of a mechanical contact.

The circuit arrangement illustrated in FIG. 3 largely coincides with that of FIG. 1. The single departure is that the semiconductor switch 7 of FIG. 1 is replaced by the mechanical contact 33. The contact 33 is always closed when the feed circuit 5 is activated. This can be achieved in that the relay winding for controlling the contact 33 is connected to the input of the feed circuit 5.

The field effect transistor switch 6 can be retained in an advantageous manner as a semiconductor switch in that no high requirements are made of its ability to inhibit. It need only be able to reliably inhibit the comparatively low locating voltage and the influencing voltages prescribed in the locating circuit by the surge arrester 27 or, respectively, 27a. The mechanical contact in the locating circuit can be more easily accepted since it is only required in case of disruption.

The circuit arrangement according to FIG. 3 is also insensitive to the overlap of two output voltages of the feed circuits 4 and 5. When, for example, the contacts 32 or, respectively, 33 are closed and the contact 31 is also closed, then the field effect transistor switch 6 becomes conductive. The constant remote feed current $I_F$ now flows in accordance with the arrows a, b, c through the diode 50. This means a short circuit at the output for the locating inverter 5. The locating inverter 5, therefore, must be short circuit proof when overlaps of the primary and locating voltages are possible.

FIG. 4 illustrates an electronic switch 60 which is advantageously employed as the semiconductor switch 6. The field effect transistor 61 has its source-drain path disposed in the current path leading from the negative pole of the assigned feed circuit to the load resistor 1 and has its control electrode connected to the other current path by way of the resistor 62. The resistor 64 and the Zener diode 63 are connected parallel to the gate-source segment, the Zener diode 63 being poled in the reverse direction for the voltage applied between the current paths.

A thyristor 65 is connected parallel to the source-drain path of the field effect transistor 61. The thyristor 65 has its anode connected to the drain electrode of the field effect transistor 61, i.e. related to the current which is output by the feed circuit assigned to the semiconductor switch, and is polarized in the conducting direction. The control electrode of the thyristor 65 is connected by way of a resistor 66 to the cathode and by way of a Zener diode 67 to the anode of the thyristor 65. The Zener diode 67 has its cathode connected to the anode of the thyristor 65 so that it is polarized in the reverse direction for current which derive from the feed circuit assigned to the semiconductor switch 60. A diode 68 is connected with the same polarization in parallel with the source-drain path of the field effect transistor 61 and the thyristor 65 and diode 68 are connected anti-parallel or, respectively, with opposite polarization.

The Zener diode 63 protects the gate-source segment against excessively high voltages. The resistor 64 is a matching resistor and the resistor 62 is a drive resistor. These resistors can be highly resistant in an advantageous manner since a static gate curent is not required.

Under given conditions, the circuit element 68 and-/or 65 can be omitted.

The field effect transistor 61 is an n-type transistor and lies in the negative line. When a p-type field effect transistor is disposed in the positive line, then the gate dropping resistor is connected to the negative line. Moreover, the source electrode and the anode of the corresponding thyristor must be connected to the positive pole of the assigned feed voltage.

Figure 5:
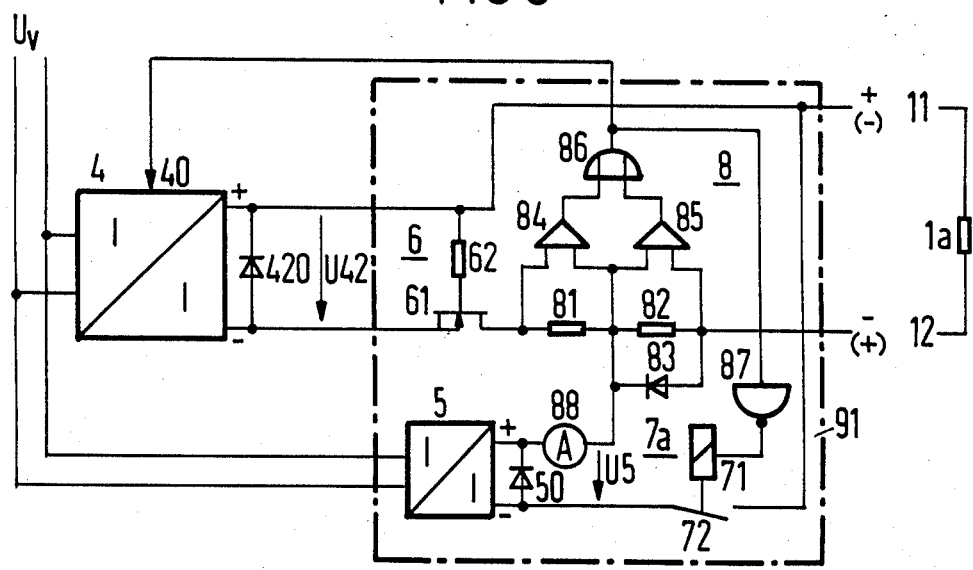
FIG. 5 is a schematic circuit diagram of a circuit arrangement in which one of the two feed circuits is located in a remote feed device and the other is located in an error locating device.

The circuit arrangement illustrated in FIG. 5 is composed of two assemblies, namely of the feed circuit 4 serving as a remote feed current source and the assembly 91 which contains the feed circuit 5 at whose output the diode 50 is poled in the reverse direction for the output voltage. The positive pole of the feed circuit 5 is connected by way of an ammeter 88 and a resistor 82 to the terminal 12 of the remote feed loop. The drain electrode of the field effect transistor 61 is connected by way of a resistor 81 and a resistor 82 in series therewith to the terminal 12 of the remote feed loop. The diode 83 is poled in the conducting direction for the remote feed current and is in parallel with the resistor 82. A comparator 84 is connected across the resistor 81 and a comparator 85 is connected across the resistor 82. The outputs of the comparators 84 and 85 are connected by way of an OR gate 86 to a control input 40 of the feed circuit 4. Further, a relay 71 is connected by way of an inverter 87 to the output of the OR gate 86.

When the resistor 82, a precision resistor, is traversed by adequate current, an "on" command is fed via the comparators 84 and 85 and the OR gate 86 to the control input 40 of the remote feed device 4 and an "off" command is fed to the relay 71.

When the remote feed connection is interrupted, then the precision resistors 81 and 82 are at first without current. By way of the OR gate 86 this yields an "off" command to the remote feed control input 40 and an "on" command to the relay 71.

The field effect transistor 6 prevents the short circuit of the locating current via the remote feed device 40. The locating current at the ammeter 88 provides information concerning the status of the remote feed section. Every locating current has an interrupt section field assigned thereto. When the remote feed section is in order, sufficient current flows via the precision resistor 82 so that an "off" command is sent to the relay 71 and an "on" command extends to the remote feed device control input 40.

Figure 6:
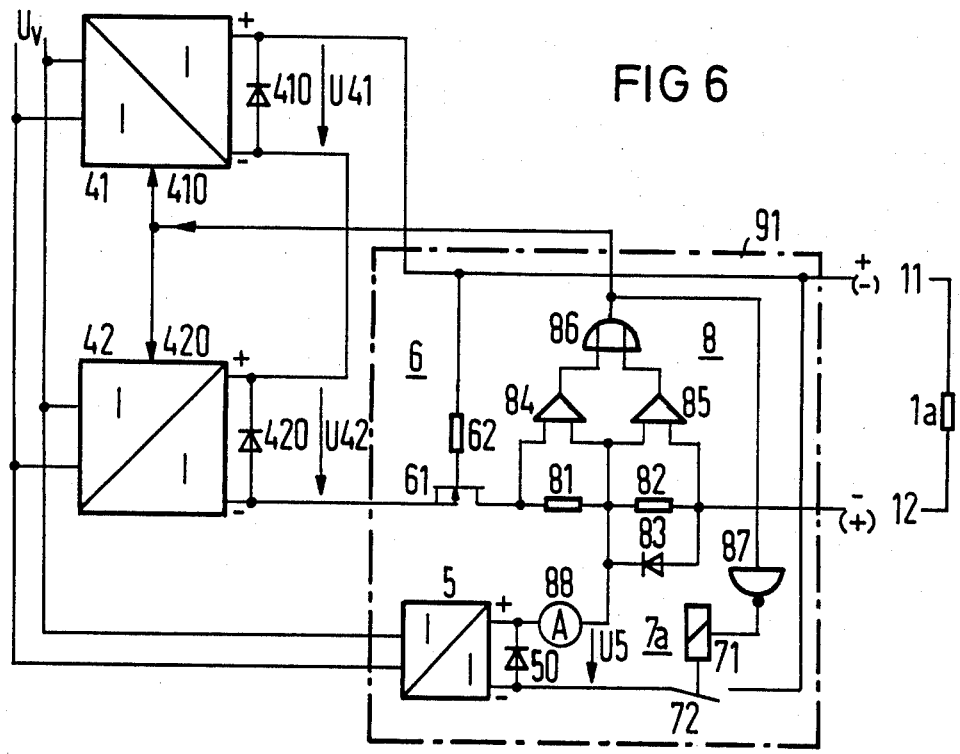
FIG 6 is a schematic circuit diagram of a circuit arrangement in which one of the two feed circuits is composed of two remote feed devices and the other is disposed in an error locating device.

The circuit arrangement according to FIG. 6 basically coincides with that according to FIG. 5. The departure is that two feed circuits 41 and 42 are provided instead of the feed circuit 4, these feed circuits 41 and 42 being connected in parallel with one another at the input and in series with one another at the output. Both feed circuits 41 and 42 comprise a diode 410 or, respectively, 420 polarized in the reverse direction for the output voltage these being effective at the output of the feed circuits 41 and 42. The output of the OR gate 86 is connected to the control inputs 410' and 420' of the feed circuits 41 and 42. The load resistor is formed by the remote feed loop 1a.

The circuit arrangement is composed of three assemblies, namely the remote feed device 41, the remote feed device 42 and the assembly 91 which serves as an additional, automatically locating device for checking the loop resistance of the remote feed loop 1a.

Figure 7:
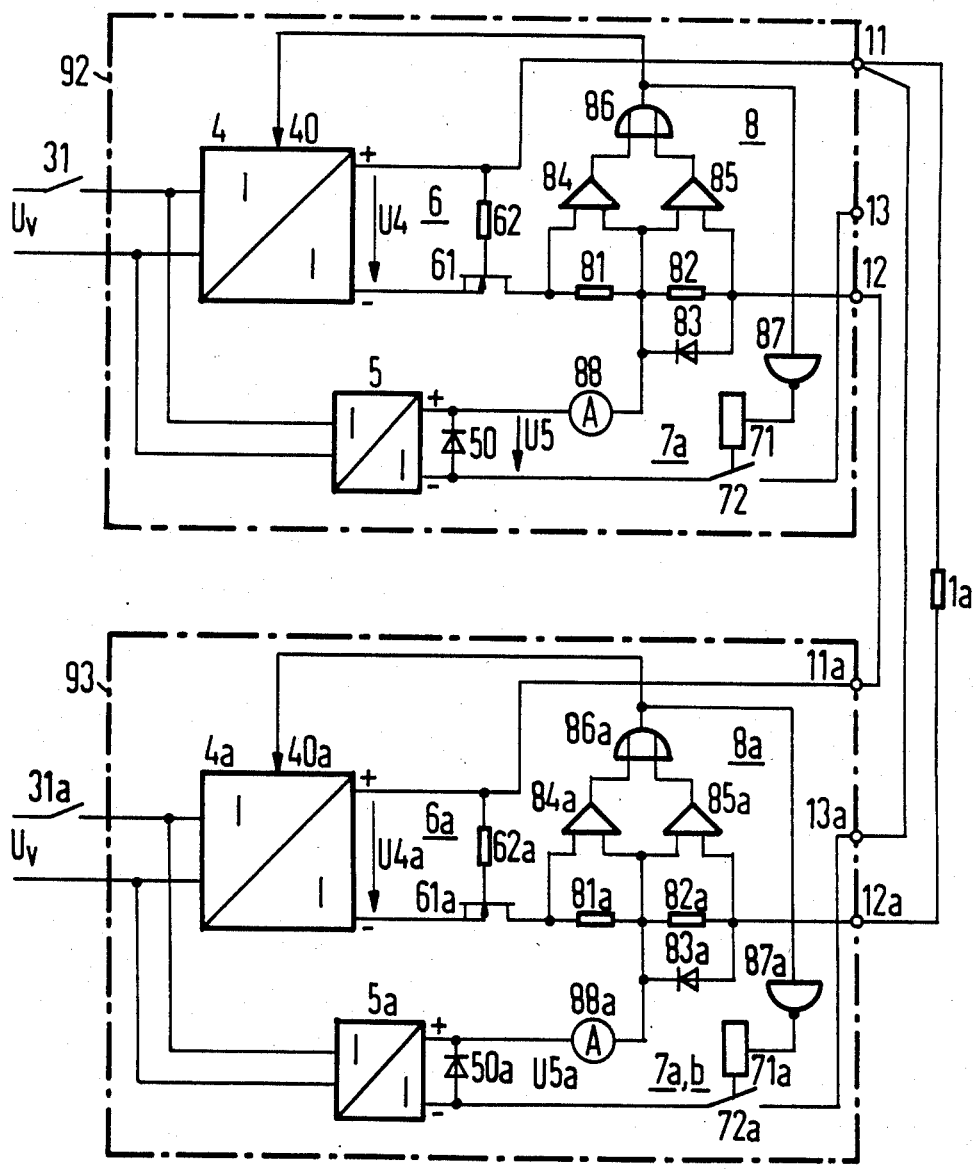
FIG. 7 is a schematic circuit diagram of a circuit arrangement comprising two identically designed remote feed devices which respectively contain a remote feed current source and a test voltage source.

Given the arrangement illustrated in FIG. 7, the remote feed loop 1a is fed by two series-connected remote feed current sources. Differing from the circuit arrangement of FIG. 6, two assemblies 92 and 93, constructed in the same manner, respectively basically coincide with the circuit arrangement of FIG. 5 and are a respective remote feed device having a built-in, inherent locating circuit. The single departure is that the relay contact 72 is not permanently connected to the terminal 11, but is connected out by way of its own terminal 13.

The utilization of identical remote feed devices has the advantage that no separate locating circuit need be manufactured. The circuit arrangement according to FIG. 7 also meets the requirement for replaceability of the remote feed devices.

In FIG. 7, the same reference characters as in FIG. 5 have been employed for the assembly 92. For the assembly 93, the reference characters are respectively provided with an additional "a", the reference characters being otherwise identical.

The output series connection of the two remote feed devices derives in that the terminal 12 of the assembly 92 is connected to the terminal 11a of the assembly 93. Further, the terminal 11 of the assembly 92 is connected to the terminal 13a of the assembly 93.

FIG. 7 contains a remote feed device comprising two series-connected remote feed circuits 92 and 93 which are constructed in the same manner and respectively contain a complete locating circuit. When the remote feed section 1a is interrupted, the precision resistors 81 and 81a are without current and the remote feed devices 92 and 93 are switched off. Simultaneously an "on" command proceeds to the locating relay 71 and 71a. Since the locating circuit 8 of the device 92 is not connected to the remote feed section, it cannot disturb the locating operation of the remote feed device 93. The ammeter 88a provides information concerning the location of the section interruption. The precision resistor 82 determines whether the remote feed section 1a is in proper order. When this is the case, the device 93 is switched on and, simultaneously, the relay contact 72a is opened. The device 92 is first not switched on since its locating circuit cannot measure any current. However, a current which comes from the series-connected device 93 flows through the device 92. The precision resistor 81 now registers whether this current has exceeded a predetermined valued. When this is true, the device 92 is also switched on.

Involved, potential-free transverse connections between the remote feed devices are saved with the assistance of the circuit format illustrated in FIG. 7.

It must also be taken into consideration that the field effect transistor inhibits when the device 92 is not switched on. It is precisely this, however, which is the case since the device 93 always switches on first after the locating operation. The field effect transistor 6 would accept the entire output voltage of the device 93 without becoming conductive and would therefore prevent the initialization of the device 92a. The same would happen if the switch 31 which, in particular, is an automatic switch, is engaged and the switch 31a were to be erroneously allowed to open. The semiconductor circuit 60 shown in FIG. 4 enables an elimination of these difficulties. Given this semiconductor circuit 60, the field effect transistor 61 is augmented by the thyristor 65 which is preferably a miniature thyristor. When the arrangement shown in FIG. 4 is not driven at the gate G and when a voltage builds up in the direction from the drain towards the source, then the arrangement behaves like a four-layer diode. When the Zener voltage of the Zener diode 67 is exceeded, the thyristor 65 triggers. The current in the thyristor 65 is accepted by the field effect transistor 61 as soon as the gate is driven. The transfer of the current occurs completely since the forward voltage of the field effect transistor 61 amounts to only a fraction of that of the thyristor 65. When, subsequent thereto, the drive is in turn removed from the gate, then the arrangement again inhibits since the thyristor 65 is free of current. This is also necessary since, given an interruption, a change of the remote feed section 1a from its conductive condition into its inhibit condition must be undertaken.

At the same time, the thyristor 65 is a protection for the field effect transistor 61 against influencing and lightening voltages. No voltage higher than the Zener voltage of the Zener diode 67 can appear at the field effect transistor 61 from the drain to the source. This Zener voltage is advantageously somewhat higher than the locating voltage, so that the capacity of the arrangement to inhibit is guaranteed during the locating operation. The diode 68 is connected parallel for protecting the arrangements against overvoltages from the source into the drain. When a thyristor which has a diode behavior from the cathode to the anode, for example, a so-called gate turn-off thyristor, is utilized as the thyristor 65, then the thyristor 65 assumes the protective function of the diode 68 and the diode 68 can be eliminated even when one must count on overvoltages of the type mentioned above.

Figure 8:
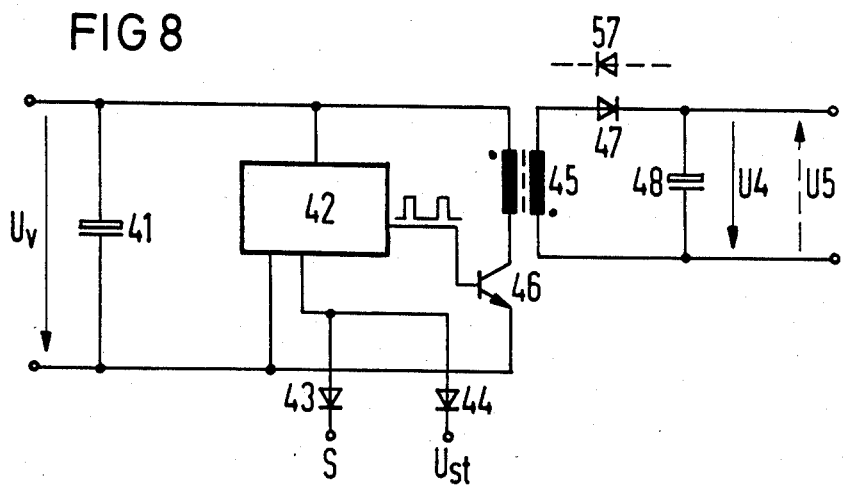
FIG. 8 is a schematic circuit diagram of a feed circuit which is designed as an arrestible converter.

The mechanical switches 31 and 32 on the 60V side of the feed circuits can be replaced with little expense by influencing the feed circuits, particularly influencing the switching transistors of the inverter circuit arrangements. An example of this is illustrated in FIG. 8. An inverter can be activated or, respectively, deactivated in accordance with FIG. 8 in that the control electronics which emits the turn-on pulses to the switching transistor 46 is enabled or inhibited by way of a control voltage.

The primary winding of a transformer 45 is connected to the capacitor 41 in a pulsed manner by way of the transistor 46, the capacitor 41 lying at the supply voltage $U_v$. The control electronics 42 serves for the drive of the transistor 46, the control electronics 42 comprising two control inputs for the inhibit signal S or, respectively, for a control voltage $U_{st}$ which are decoupled from one another by way of the diodes 43 and 44. The secondary winding of the transformer 45 is connected by way of a diode 47 to an output capacitor 48. The poling of the diode 47 yields the positive output voltage U4. When the diode 47 is replaced by the diode 57, then the opposite polarity voltage U5 is applied to the output.

The feed circuit illustrated in FIG. 5 is designed in a known manner (see Funkschau 1/1983, Page 68) as a single-ended blocking oscillator. The switching transistor 46 is conductive during the pulse duration. Given a constant period, the pulse duration and, therefore, the voltage U4 or, respectively, U5 is varied by the control voltage $U_{st}$. When the negative control voltage becomes greater in terms of magnitude, then the pulse become narrower and narrower and finally disappear. The output voltage U4 or, respectively, U5 then becomes "zero". Independently of the control voltage $U_{st}$, the voltage U4 or, respectively, U5 can likewise be brought to "zero" at the terminal S for the pulse cancellation by application of a suitable voltage.

When the diode 47 of FIG. 8 is replaced by the diode 57, the fundamental circuit diagram of a flow converter is obtained. The drive of the pulses and the electronic device disconnect remains fundamentally maintained.

Figure 9:
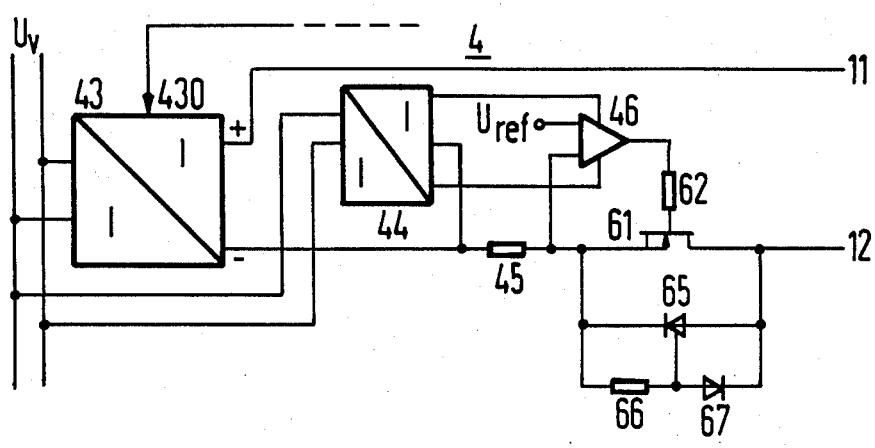
FIG. 9 is a schematic circuit diagram of a circuit arrangement comprising a semiconductor switch driven by an auxiliary voltage.

FIG. 9 illustrates a circuit arrangement in which the semiconductor switch is driven by an auxiliary voltage source of the assigned feed circuit 4. In addition to the primary inverter 43, the feed circuit 4 also contains an auxiliary inverter 44 which is likewise connected to the supply voltage $U_v$ and generates the auxiliary voltages required in the primary inverter 43. A terminal for the reference potential at the auxiliary inverter 44 is connected to the positive pole of the output of the primary inverter 43.

The resistor 45 is disposed between the positive pole of the output of the primary inverter 43 and the source of the field effect transistor 61. The comparator 46 has one input connected to a comparison voltage $U_{ref}$ and its other input connected to the source of the field effect transistor 6] and is fed from the auxiliary voltage source 44.

In accordance with FIG. 4, the thyristor 65, the Zener diodes 67 and the resistor 66 are disposed parallel to the field effect transistor 61 in FIG. 9.

When the primary inverter 43 of the feed circuit 4 is activated with the assistance of a control potential applied to the control input 430, then a current flows by way of the resistor 45 and the thyristor 65, this current causing a voltage drop at the resistor 45. This voltage drop is compared in the comparator 46 to the reference voltage $U_{ref}$.

When the current exceeds a predetermined limit value, then the comparator 46 applies turn-on potential to the control electrode of the field effect transistor 61 by way of the resistor 62. The field effect transistor 61 becomes conductive and shunts the thyristor 65.

The limit value of the current at which the comparator 46 responds is advantageously selected such that it lies above the short-circuit current of the auxiliary inverter 5 (FIG. 5).

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for feeding current to and checking the loop resistance of a loop which includes a load, said circuit arrangement comprising
   a first pair of leads including a distal end for connection to a load and a proximal end;
   a second pair of leads and a third pair of leads connected to and forming branches of said first pair of leads;
   a current feed circuit connected to said second pair of leads;
   a voltage feed circuit connected to said third pair of leads and including current measuring means for determining loop resistance of said first and third pair of leads and the load;
   control means for alternately activating said current and voltage feed circuits; and
   first and second switches respectively interposed in said second and third pairs of leads and operable to complete a loop between the respective activated feed circuit and the load and open the loop between the respective inactive feed circuit and the load.

2. The circuit arrangement of claim 1, wherein:
   said first switch comprises a transistor including a control conduction path serially connected in one lead of said second pair of leads and a control electrode connected to the other lead of said second pair of leads.

3. The circuit arrangement of claim 1, wherein:
   each of said switches comprises a control conduction path serially interposed in one of the leads of the respective pair of leads and a control electrode connected to the other lead of the respective pair of leads.

4. A circuit arrangement comprising:
   first and second feed circuits for connection to a load with mutually opposite polarity;
   a feed control device connected to and operable to alternately activate said feed circuit;
   each of said feed circuits including a pair of output leads, said leads connected together to form a common pair of leads for connection to the load;
   a transistor including a control electrode for receiving control signals for rendering the same conductive and non-conductive and a control conduction path connected in series with one of the leads of one of said pairs of leads, said transistor rendered conductive during activation and operation of the respective feed circuit and inhibited during operation of the other feed circuit; and
   switch means connected in series with a lead of the other pair of leads and operated to be conductive when said transistor is inhibited.

5. The circuit arrangement of claim 4, wherein:
   said control electrode is connected to the other lead of the one pair of leads.

6. The circuit arrangement of claim 4, and further comprising:
   an auxiliary feed circuit in one of said feed circuits connected to said control electrode.

7. The circuit arrangement of claim 4, wherein:
   said first feed circuit is a remote current feed circuit for the load;
   said second feed circuit is a voltage feed circuit;
   said transistor control electrode is connected to the other lead of the pair of leads having the lead connected to the control conduction paths; and further comprising
   locating means interposed in the loop formed by the load and the pair of leads connected to said second feed circuit for measuring the loop resistance.

8. The circuit arrangement of claim 4, wherein:
   said transistor is a field effect transistor including a sourcedrain path as said control conduction path and a gate connected to the other lead of the pair of leads.

9. The circuit arrangement of claim 4, and further comprising:
   a diode connected across the output of one of said feed circuits and polarized in the reverse direction with respect to the output voltage.

10. The circuit arrangement of claim 4, wherein:
    said second switch comprises a relay contact serially connected in one of the leads of the respective pair of leads.

11. The circuit arrangement of claim 4, and further comprising:
    a first current measurement resistor connected in series in one of the leads connected to said first lead circuit;
    a second current measurement resistor connected in series with said first current measuring resistor and in series with one lead of the common pair of leads;
    a diode connected in parallel to said second current measuring resistor and poled in the conductive direction for the remote feed current;
    a first comparator connected across said first current measuring resistor and a second comparator connected across said second current measuring resistor;
    said first feed circuit comprising an on-off control input for receiving on and off control signals; and an OR gate connected to said first and second comparators and connected to said on-off control input and operable to produce on and off control signals in accordance with the current flowing through said first and second current measuring resistors.

12. The circuit arrangement of claim 4, and further comprising:
    a thyristor including an anode, a cathode and a control electrode, said anode and cathode connected across said control conduction path;
    a resistor connected between said control electrode and one end of said control conduction path; and
    a Zener diode connected between said control electrode and the other end of said control conduction path, said Zener diode and said thyristor poled in opposite directions.

13. The circuit arrangement of claim 12, and further comprising:
    a further resistor connected between said control electrode of said transistor and said one end of said control conduction path.

14. The circuit arrangement of claim 13, and further comprising:
    a further Zener diode connected across said resistor and poled in the direction from said one of said control conduction path to said control electrode of said transistor.

15. The circuit arrangement of claim 14, and further comprising:
    relay means including a relay winding and a relay contact constituting said second switch; and
    an inverter connected between said OR gate and said relay winding so that said on-off signals are inverted and said relay operates alternately with said current feed circuit.

* * * * *